United States Patent
Eidson

(10) Patent No.: US 7,437,265 B2
(45) Date of Patent: Oct. 14, 2008

(54) DESIGNING TIME-BASED MEASUREMENT/CONTROL SYSTEM

(75) Inventor: John C. Eidson, Palo Alto, CA (US)

(73) Assignee: Agilent Technologies, Inc., Santa Clara, CA (US)

(*) Notice: Subject to any disclaimer, the term of this patent is extended or adjusted under 35 U.S.C. 154(b) by 49 days.

(21) Appl. No.: 11/117,811

(22) Filed: Apr. 29, 2005

(65) Prior Publication Data
US 2006/0247893 A1    Nov. 2, 2006

(51) Int. Cl.
*G04F 1/00* (2006.01)
(52) U.S. Cl. ..................................................... 702/176
(58) Field of Classification Search ................ 702/176; 711/112; 709/205, 250; 84/600; 370/393
See application file for complete search history.

(56) References Cited

U.S. PATENT DOCUMENTS

| | | | |
|---|---|---|---|
| 6,442,648 B1* | 8/2002 | Genduso et al. | 711/112 |
| 7,007,107 B1* | 2/2006 | Ivchenko et al. | 709/250 |
| 2002/0136217 A1* | 9/2002 | Christensen | 370/393 |
| 2006/0162532 A1* | 7/2006 | Eidson et al. | 84/600 |

FOREIGN PATENT DOCUMENTS

EP    0 389 683    10/1990

OTHER PUBLICATIONS

GB Search Report dated Jul. 4, 2006.

* cited by examiner

*Primary Examiner*—Tung S Lau
*Assistant Examiner*—Xiuquin Sun

(57) ABSTRACT

A method for designing a measurement/control system that enables a system designer to explicitly specify the portions of a measurement/control system that are subject to a set of time constraints and the portions of the measurement/control system that are not directly subject to the set of time constraints. A method according to the present teachings includes determining an HRT/SRT boundary between a hard real-time (HRT) portion of a measurement/control system and a soft real-time (SRT) portion of the measurement/control system and determining a buffer for the HTR/SRT boundary in response to a set of time constraints associated with the HRT portion.

17 Claims, 6 Drawing Sheets

DESIGNING TIME-BASED MEASUREMENT/CONTROL SYSTEM

BACKGROUND

A design system for a measurement/control system may include software tools that enable a designer to select and arrange a set of system components. For example, software tools may enable a system designer to select and arrange a set of measurement instruments and controllers and a communication mechanism for communication among the instruments and controllers. A design system may include software tools that generate code for the behaviors of the instruments and the controllers.

A measurement/control system may be subject to a set of time constraints. For example, a measurement/control system may be subject to a set of time constraints that pertain to a device under test, e.g. a measurement sample rate. In another example, a measurement/control system may be subject to a set of time constraints that pertain to a system being controlled, e.g. rate of control value updates.

Unfortunately, prior design systems having a data flow/state machine system model may not provide sufficient tools for adapting a measurement/control system to a set of time constraints. For example, a prior design system may not enable a designer to adapt a design to the time constraints of behaviors in components that directly interact with a device under test. As a consequence, the timing of behaviors in components may be at the mercy of network communication loads and the activities of the operating systems in the components. Such uncertainties may complicate the process of designing a measurement/control system and increase the costs of system design.

SUMMARY OF THE INVENTION

A method for designing a measurement/control system is disclosed that enables a system designer to explicitly specify the portions of a measurement/control system that are subject to a set of time constraints and the portions of the measurement/control system that are not directly subject to the set of time constraints. A method according to the present teachings includes determining an HRT/SRT boundary between a hard real-time (HRT) portion of a measurement/control system and a soft real-time (SRT) portion of the measurement/control system and determining a buffer for the HTR/SRT boundary in response to a set of time constraints associated with the HRT portion.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
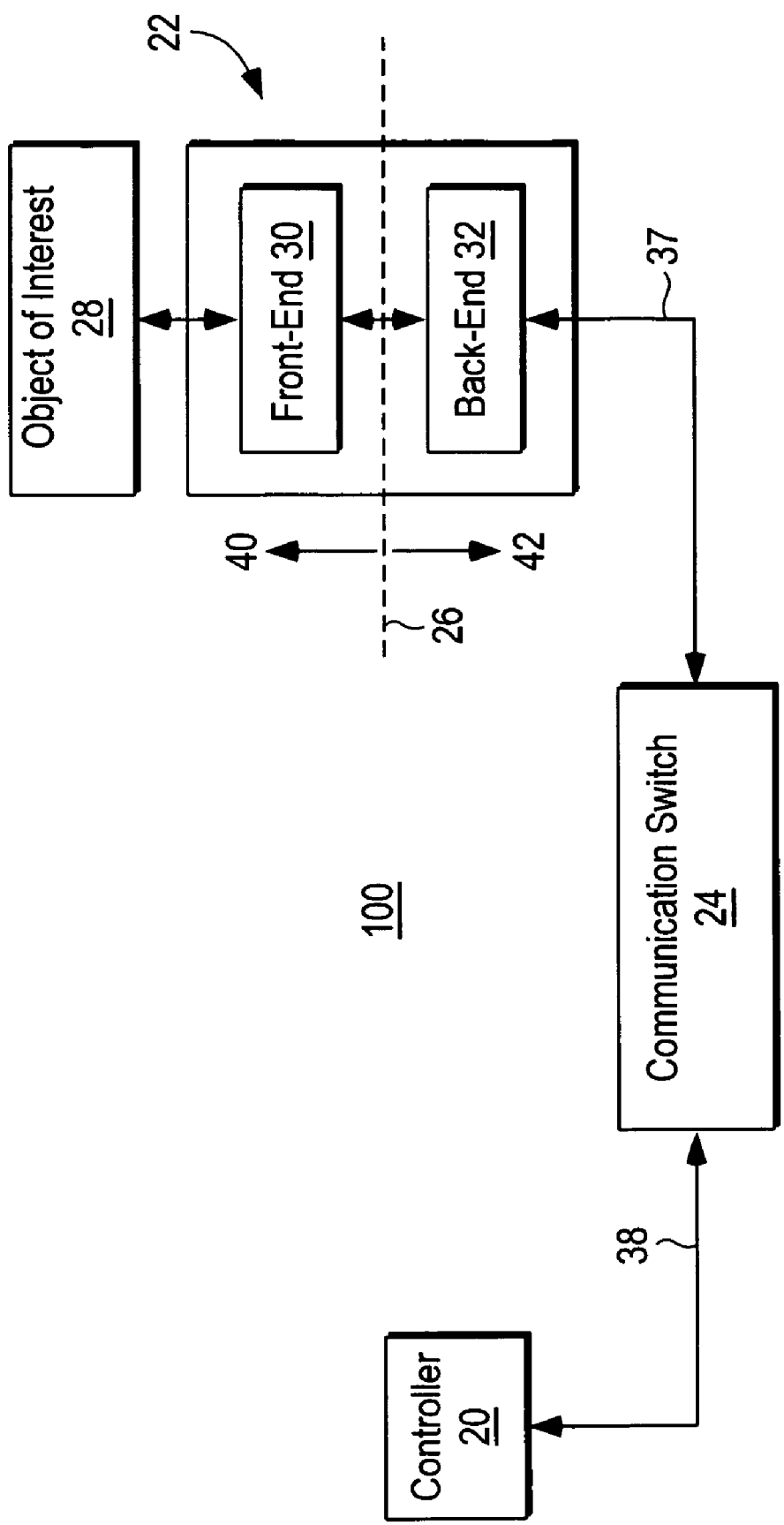
FIGS. 1-3 show example measurement/control systems that may be designed using the present techniques.

FIG. 1 shows a measurement/control system 100 that may be designed using the present teachings. The measurement/control system 100 includes a controller 20 and an instrument 22 that communicate via a set of communication links 37-38 and a communication switch 24. The instrument 22 interacts directly with an object of interest 28. The object of interest 28 may be a device under test (DUT), an industrial system, a physical environment, etc.

The instrument 22 includes a front-end 30 and a back-end 32. The front-end 30 interacts directly with the object of interest 28 via a set of lines 36. For example, the front-end 30 may include sample/hold circuitry, A/D conversion circuitry, etc., and associated firmware for obtaining data samples from the object of interest 28 as well as circuitry and firmware for applying stimuli to the object of interest 28. The back-end 32 includes mechanisms, e.g. processor and network hardware/firmware for communicating with the controller 20 via the communication switch 24. The back-end 32 may also include mechanisms for performing computations on data obtained by the front-end 30 and for computing control values for stimuli to be applied to the object of interest 28.

The controller 20 includes processor and network communication mechanisms for communicating via the communication switch 24. The controller 20 interacts indirectly with the object of interest 28 by obtaining data from the instrument 22 and sending commands to the instrument 22 via the communicant switch 24.

The present techniques for designing a measurement/control system include determining a boundary between a hard real-time (HRT) portion of the measurement/control system and a soft real-time (SRT) portion of the measurement/control system. The HRT portion of a measurement/control system is a portion of the measurement/control system that is subject to a set of time constraints. The set of time constraints may be those associated with an object of interest for the measurement/control system. The SRT portion of a measurement/control system is a portion of the measurement/control system that is not directly subject to the set of time constraints, e.g. because it does not directly interact with an object of interest. A boundary between the HRT and SRT portions of a measurement/control system designed according to the present techniques is referred to as an HRT/SRT boundary.

In the example measurement/control system 100, an HRT/SRT boundary 26 is located between the front-end 30 and back-end 32 in the instrument 22 because the front-end 30 interacts directly with the object of interest 28 and must meet a set of time constraints associated with the object of interest 28, e.g. a data sampling rate or a control value update rate. The front-end 30 is an HRT portion 40 of the measurement/control system 100. The back-end 32 of the instrument 22 along with the communication switch 24 and the controller 20 are an SRT portion 42 of the measurement/control system 100 because the controller 20, the communication switch 24 and the back-end 32 do not interact directly with the object of interest 28 and are not subject directly to the time constraints associated with the object of interest 28. For example, the controller 20 may generate control values to be applied to the object of interest 28 but it does not apply the control values to the object of interest 28.

Figure 2:
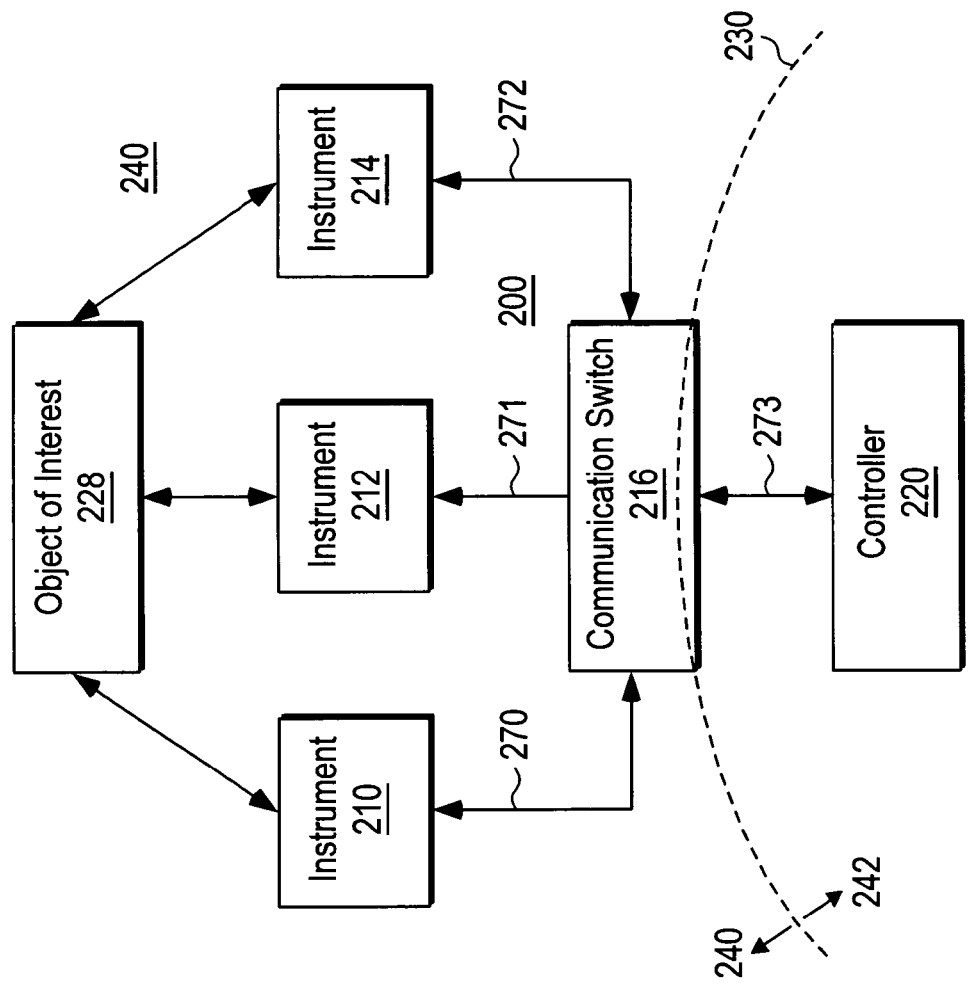

FIG. 2 shows a measurement/control system 200 that may be designed using the present teachings. The measurement/control system 200 includes a controller 220 and a set of instruments 210-214 that communicate via a communication switch 216 and a set of communication links 270-273, respectively. The instruments 210-214 interact directly with an object of interest 228. The controller 220 interacts indirectly with the object of interest 228 by obtaining data from the instruments 210-214 and sending commands to the instruments 210-214 via the communicant switch 216.

In the example measurement/control system 200, an HRT/SRT boundary 230 is located between the controller 220 and the communication switch 216 because the instruments 210-214 interact directly with the object of interest 228 and must meet a set of time constraints associated with the object of interest 228. The instruments 210-214 along with a portion of the communication switch 216 that communicates with the instruments 210-214 are an HRT portion 240 of the measurement/control system 200. The controller 220 along with a portion of the communication switch 216 that communicates with the controller 220 are an SRT portion 242 of the measurement/control system 200.

Figure 3:
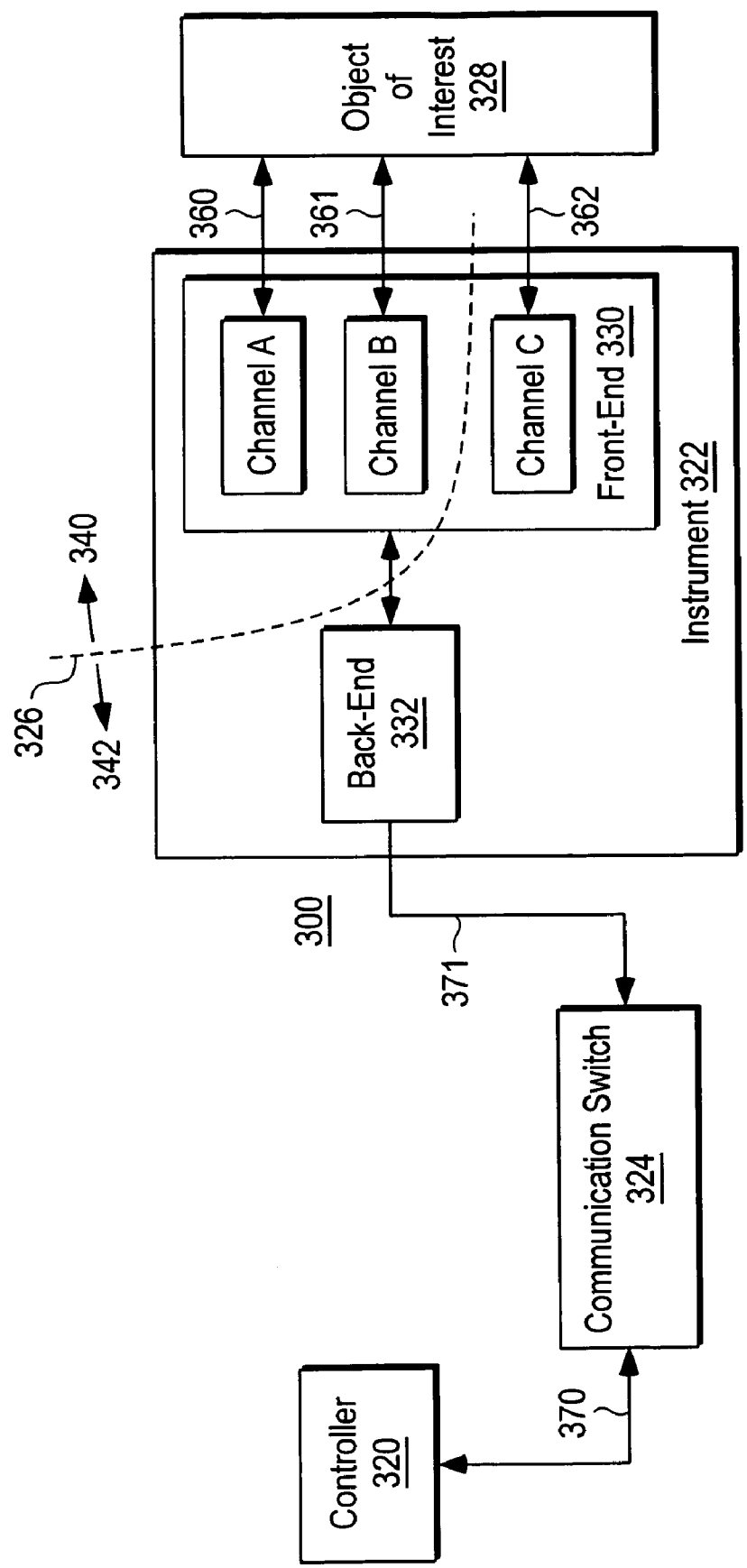

FIG. 3 shows a measurement/control system 300 that may be designed using the present teachings. The measurement/control system 300 includes a controller 320 and an instrument 322 that communicate via a communication switch 324 and a set of communication links 370-371. The instrument 322 includes a back-end 332 and a front-end 330 having a set of channels A-C that interact directly with an object of interest 328 via a set of lines 360-362. The channels A-C may include any combination of measurement and stimulus channels. The channels A and B are subject to a set of time constraints associated with an object of interest 328. The channel C is not subject to the time constraints associated with an object of interest 328. The controller 320 interacts indirectly with the object of interest 328 by obtaining data from the instrument 322 and sending commands to the instrument 322 via the communicant switch 324.

In the example measurement/control system 300, an HRT/SRT boundary 326 is located between the channels A and B and the remainder of the instrument 322 because the channels A and B must meet the time constraints associated with the object of interest 328. The channels A and B are an HRT portion 340 of the measurement/control system 300. The controller 320 and the communication switch 324 along with channel C and the back-end 332 of the instrument 322 are an SRT portion 342 of the measurement/control system 300 which are not directly subject to the time constraints associated with the object of interest 328.

The present techniques for designing a measurement/control system include providing an HRT/SRT buffer between the HRT and SRT portions of the measurement/control system. An HRT/SRT buffer enables speed matching between the HRT and SRT portions of a measurement/control system. An HRT/SRT buffer may buffer commands or data or a combination of commands and data. An HRT/SRT buffer may be implemented as separate command and data buffers.

Figure 4:
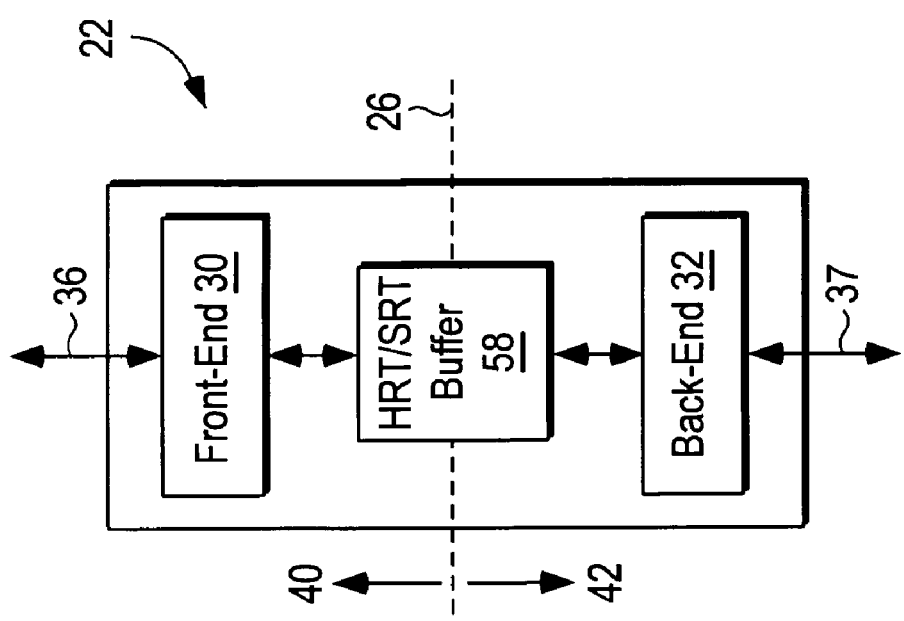
FIG. 4 shows an example HRT/SRT buffer in an instrument according to the present teachings.

FIG. 4 shows an HRT/SRT buffer 58 in the instrument 22 of the example measurement/control system 100 according to the present teachings. The HRT/SRT buffer 58 is located at the HRT/SRT boundary 26 between the front-end 30 and back-end 32 in the instrument 22. The front-end 30 stores data samples into the HRT/SRT buffer 58 at an HRT sample rate associated with the object of interest 28. The back-end 32 empties the data samples from the HRT/SRT buffer 58 at a relaxed rate in comparison to the HRT sample rate. The back-end 32 transfers data samples from the HRT/SRT buffer 58 to the controller 20 according to the available bandwidth of the communication switch 24.

The present techniques include determining a set of parameters for an HTR/SRT buffer in response to the time constraints of the HRT portion of a measurement/control system. For example, the capacity of the HRT/SRT buffer 58 may be selected in response to the HRT sample rate so that the HRT/SRT buffer 58 has enough capacity to prevent an overflow given the relaxed speed at which the SRT portion 42 is able to empty the HRT/SRT buffer 58.

Figure 5:
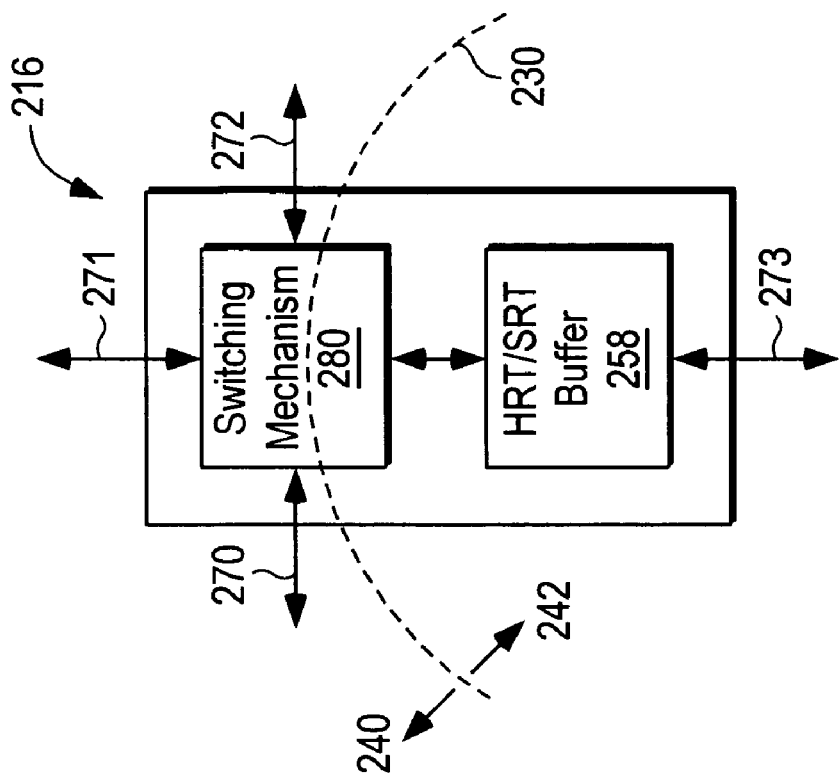
FIG. 5 shows an example HRT/SRT buffer in a communication switch according to the present teachings.

FIG. 5 shows an HRT/SRT buffer 258 in the communication switch 216 of the example measurement/control system 200 according to the present teachings. The HRT/SRT buffer 258 is located between a switching mechanism 280 of the communication switch 216 and the communication link 273 to the controller 220.

The HRT/SRT boundary 230 is located in the switching mechanism 280 so that part of a switching fabric in the switching mechanism 280 is dedicated to the HRT portion 240. For example, a portion of the switching fabric located in the HRT portion 240 may have dedicated connections among the communication links 270-272 to maximize throughput for the HRT portion 240. The dedicated connections in the switching fabric may only be active during specified time intervals, e.g. in response to an arming signal.

The HRT/SRT buffer 258 receives data samples obtained by the instruments 210-214 at an HRT sample rate required by the object of interest 228 and the available bandwidth on the communication links 270-272 is selected to support the HRT sample rate. The measurement/control system 200 may include an arming mechanisms that inhibits traffic on the communication links 270-273 other than the traffic that carries data samples from the instruments 210-214 to the HRT/SRT buffer 258 during specified periods, e.g. measurement runs on the object of interest 228. The controller 220 empties the data samples from the HRT/SRT buffer 258 at a relaxed rate in comparison to the rate at which the HRT/SRT buffer 258 is filled. The controller 220 empties the HRT/SRT buffer 258 according to the available bandwidth on the communication link 273 and the workload of the operating system in the controller 220.

The communication links 270-272 to the instruments 210-214 may be dedicated links, i.e. no other devices share those links so that maximum bandwidth may be provided to the instruments 210-214 in the HRT portion 240 of the measurement/control system 200.

Figure 6:
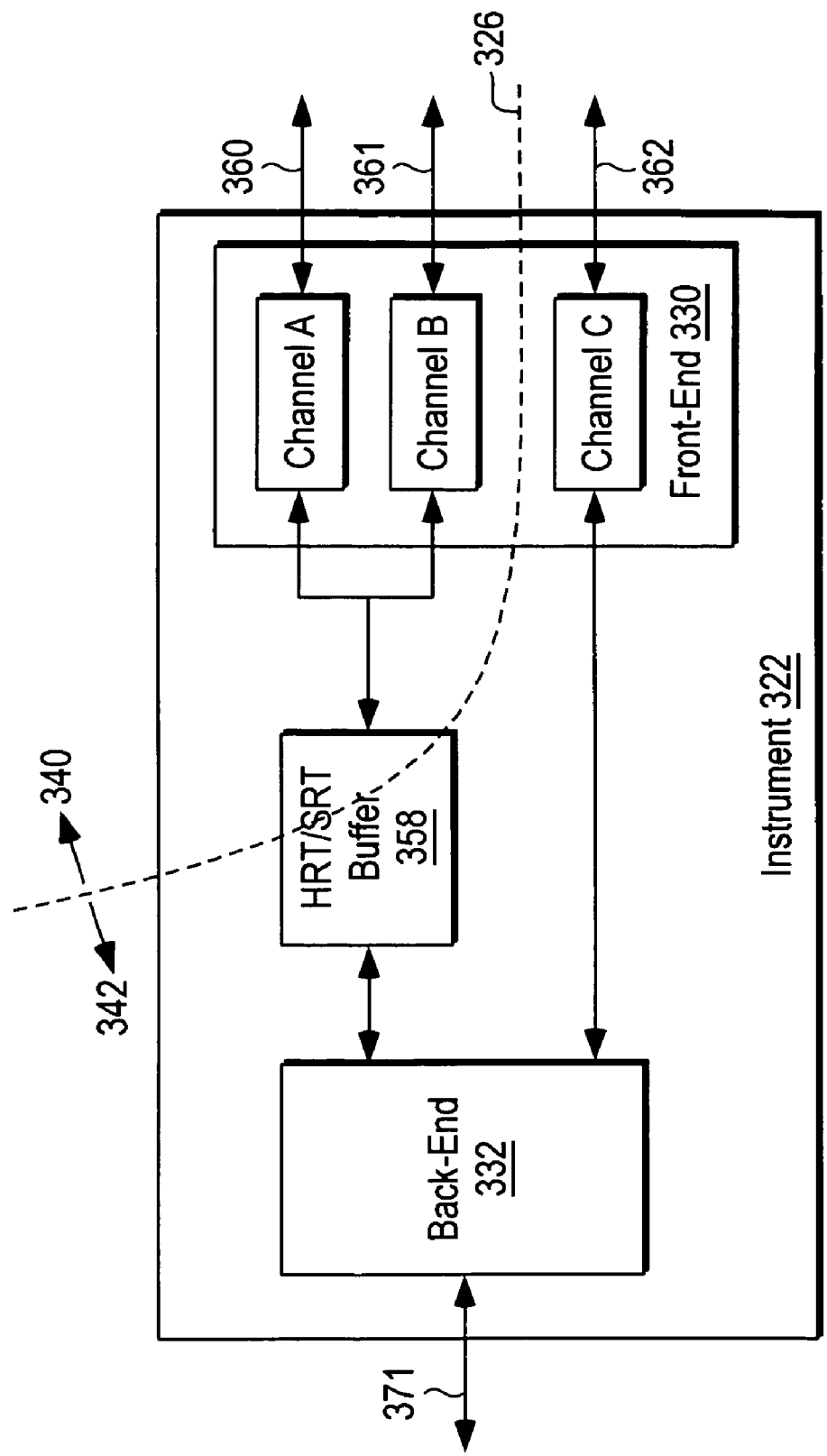
FIG. 6 shows an example HRT/SRT buffer in an example multi-channel instrument according to the present teachings.

FIG. 6 shows an HRT/SRT buffer 358 in the instrument 322 of the example measurement/control system 300 according to the present teachings. The HRT/SRT buffer 358 is located at the HRT/SRT boundary 326. The channels A and B store data samples into the HRT/SRT buffer 358 at an HRT sample rate associated with the object of interest 328. The back-end 32 empties the data samples from the HRT/SRT buffer 358 and transfers the data samples to the controller 320 according to the available bandwidth of the communication switch 324.

The present techniques for designing a measurement/control system include generating an HRT time script that specifies a schedule for the behaviors of an HRT portion of the measurement/control system. The HRT time script may specify, for example, a set of parameters for the sampling or stimulus behaviors in the HRT portion. Examples of parameters include start times for the behaviors and sampling/stimulus rates. The HRT portion of a measurement/control system according to the present techniques may include synchronized real-time clocks and sample/hold, triggering hardware, etc., that respond to the parameters provided in an HRT time-script.

An HRT time-script may be implemented with a notation that is adapted to measurement/control systems. For example, an HRT time-script may be represented in a graphical design environment using a visual notation that is analogous to a musical score. The visual notation may be implemented so that it enables a specification of an infinite time in the past, e.g. events or phenomena that have been happening forever in conceptual terms, and enables a specification of an infinite time in the future, e.g. an event or phenomena that once started continues. The visual notation may be implemented so that it enables a specification of finite time into the future, e.g. an event or phenomena runs to completion and a time trace ends at that point. The visual notation may be implemented so that it enables a specification of a time interval, e.g. periods of time in which an event or phenomena may happen or must happen. The visual notation may be implemented so that it enables a specification of a repetitive time execution appropriately phased with an appropriate epoch. The visual notation may be implemented so that it enables a specification of a scheduled change of script and temporal break point changes. The visual notation may be implemented so that it enables a specification of conditional temporal states, e.g. an armed state. The visual notation may be implemented so that it enables a specification of statistical events, e.g. a probability that an event will occur in a specified time interval.

The visual notation may be implemented so that it enables a specification of time threads, e.g. separate HRT time-scripts that may interact via other mechanisms but which have their own independent specifications. This may allow explicit notation of parallel execution whether or not the parallel threads are coordinated.

The visual notation may be implemented so that it enables a specification of temporal break points during which choices, e.g. those rendered on the SRT portion, are executed. The choices may result in an change/update to the timing, e.g. via a new HRT time-script.

The visual notation may be implemented so that it enables a hierarchical time specification. The specification may be by analogy with drill down in data flow and fine-grained temporal execution may be visible as a aggregate for a device or collection of devices.

An HRT/SRT boundary according to the present techniques may be determined statically as well as dynamically. For example, the location of an HRT/SRT boundary and/or the parameters for a corresponding HTR/SRT buffer may be changed at run-time in a measurement/control system based on operational conditions, and/or based on time, etc. A run-time change may be a change at the start of operation of a measurement/control system, i.e. at system set up, or a change during the course of operation of the measurement/control system. One example embodiment of a dynamic HTR/SRT boundary employs an arming mechanism in which a dynamic HTR/SRT boundary does not exist until activated by an arming signal. An arming signal generated by a controller places a communication switch at the dynamic HRT/SRT boundary in an armed state. The armed state inhibits traffic on a set of communication links to the communication switch at dynamic HRT/SRT boundary other than the traffic that carries data samples from instruments during specified periods, e.g. measurement runs on an object of interest.

Figure 7:
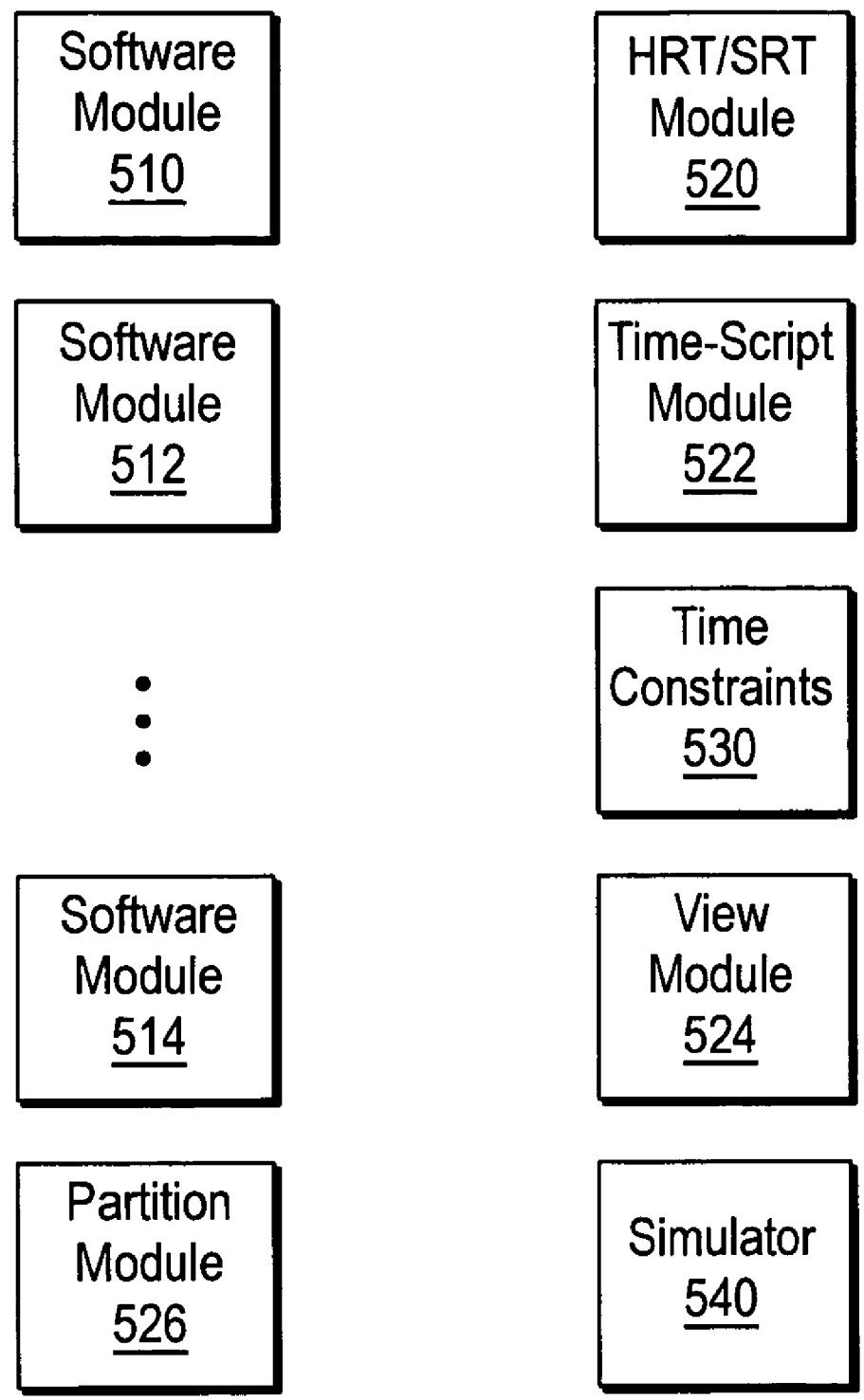
FIG. 7 shows a design system according to the present teachings.

FIG. 7 shows a design system 500 according to the present teachings. The design system 500 include a set of software modules 510-514 that provide a data flow/state machine model for designing a measurement/control system. The modules 510-514 include modules that enable a designer to select components, e.g. instruments, controllers, communication switches, etc., and access libraries that provide design parameters associated with the selected components. The modules 510-514 include modules that provide a graphical user interface for selecting and arranging the components and for specifying functions to be performed by the selected components.

The design system 500 includes an HRT/SRT module 520 that enables a designer to specify a location of an HRT/SRT boundary in a measurement/control system under design using a graphical design interface. The HRT/SRT module 520 determines a set of parameters for an HRT/SRT buffer for the selected location. The HRT/SRT module 520 also enables modifications to the HRT/SRT boundary and/or HRT/SRT buffer at run-time. The design system 500 includes a time-script module 522 that generates HRT time-scripts for the HRT portion of a measurement/control system in response to a set of time-constraints 530 and the location and parameters of an HRT buffer.

The design system 500 includes a view module 524 that provides a view at design time of a set of specified and/or simulated interactions between the HRT and SRT portions of a measurement/control system. The design system 500 enables entry/modification to the time constraints 530 for an HRT portion and performs a simulation that tests the ability of an SRT portion to keep up with the HRT portion, e.g. the ability of the SRT portion to adequately empty an HRT/SRT buffer and prevent a buffer overrun. In addition, the design system 500 allows additions of tasks to an SRT portion and a simulation and evaluation of the ability of the SRT portion to adequately empty an HRT/SRT buffer and prevent a buffer overrun.

The design system 500 includes a partition module 526 for partitioning an application among a set of components of a measurement/control system vis-à-vis an HRT/SRT boundary. For example, a measurement/control system may include a number of controllers each of which is capable of executing a portion, e.g. one or more software tasks, of a distributed application. The partition module 526 provides a designer the capability of specifying which tasks are to execute on the controllers in an SRT portion and which tasks are to execute on controllers in an HRT portion of a measurement/control system. For example, a designer may specify that tasks that are subject to a set of time constraints are to execute on a controller that is in an HRT portion and tasks that are not directly subject to a set of time constraints are to execute on a controller that is in an SRT portion of a measurement/control system. An example of a task that is subject to a set of a set of time constraints is a task that samples an object of interest or that generates control values to be applied to an object of interest in a time-critical control loop. An example of a task that is not directly subject to a set of time constraints is a task that pre-computes control values, parameters, etc., before an experiment is to be run on an object of interest.

The design system 500 includes a simulator 540 that enables a designer to evaluate and change the assignments of tasks to controllers. For example, simulation results that indicate HRT/SRT buffer overflows may be the basis for re-allocating tasks to controllers and/or upgrading system hardware, e.g. adding addition controllers, higher performance processors, faster communication switches, etc. The simulator 540 enables a trial and error approach to partitioning an application among a set of components. In addition, the software tasks that are assigned to different components may be designed to minimize the shared state among the tasks so as to minimize network communication among the components. This may facilitate the communication bandwidth available for meeting HRT tasks.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method for designing a system, comprising:

specifying a boundary between a hard real-time (HRT) portion of the system and a soft real-time (SRT) portion of the system;

determining a set of parameters for a buffer for the boundary in response to a set of time constraints associated with the HRT portion;

using the set of parameters in designing the system; and generating a time-script that specifies a set of parameters for a set of behaviors of the HRT portion.

2. The method of claim 1, wherein specifying a boundary includes specifying a boundary between a front-end and a back-end in an instrument.

3. The method of claim 1, wherein specifying a boundary includes specifying a boundary between a set of channels in a front-end of an instrument.

4. The method of claim 1, wherein specifying a boundary includes specifying a boundary in a communication mechanism in the system.

5. The method of claim 1, wherein determining a set of parameters for a buffer includes determining a capacity for the buffer.

6. The method of claim 1, further comprising altering the boundary at run-time.

7. The method of claim 1, further comprising simulating an operation of the buffer in response to the time constraints.

8. The method of claim 1, further comprising allocating a set of tasks of an application program in the system across the boundary.

9. A design system comprising:

a module that enables a designer to specify a boundary between a hard real-time (HRT) portion and a soft real-time (SRT) portion of a system under design and that determines a set of parameters for a buffer for the boundary in response to a set of time constraints associated with the HRT portion, wherein the set of parameters is used to design the system; and a time-script module that generates a time-script that specifies a set of parameters for a set of behaviors of the HRT portion.

10. The design system of claim 9, wherein the module enables the designer to specify a boundary between a front-end and a back-end in an instrument.

11. The design system of claim 9, wherein the module enables the designer to specify a boundary between a set of channels in a front-end of an instrument.

12. The design system of claim 9, wherein the module enables the designer to specify a boundary in a communication mechanism.

13. The design system of claim 9, wherein the parameters include a capacity for the buffer.

14. The design system of claim 9, further comprising a time-script module that generates a time-script that specifies a set of parameters for a set of behaviors of the HRT portion.

15. The design system of claim 9, wherein the module enables alterations to the boundary at run-time.

16. The design system of claim 9, further comprising a simulator for simulating an operation of the buffer in response to the time constraints.

17. The design system of claim 9, further comprising a partition module for allocating a set of tasks of an application program across the boundary.

* * * * *